Patented Sept. 29, 1953

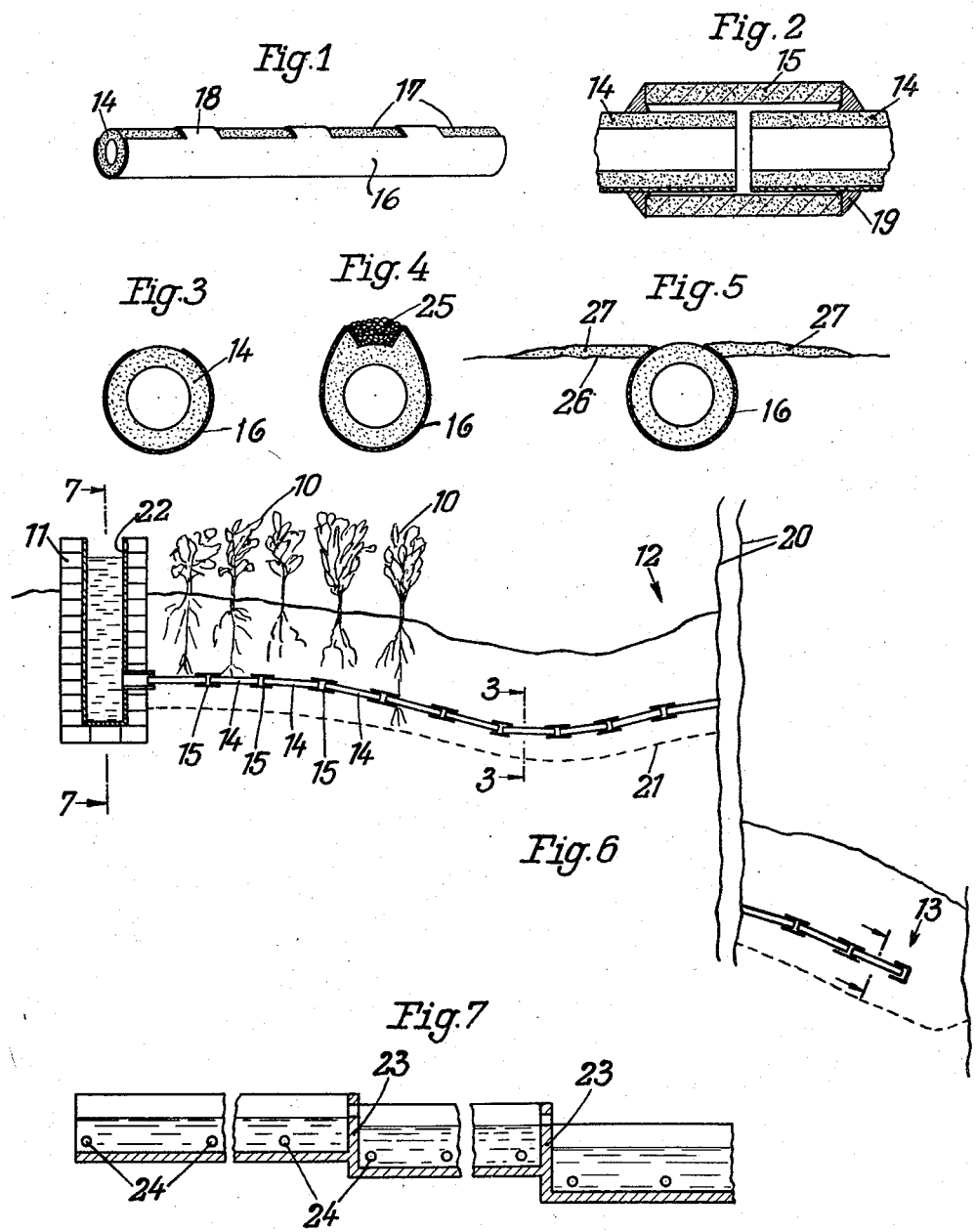

2,653,449

UNITED STATES PATENT OFFICE 2,653,449

SOIL IRRIGATION SYSTEM

Fritz Stauch, Greater Berlin, Germany

Application February 15, 1949, Serial No. 76,494
In Germany October 1, 1948

9 Claims. (Cl. 61—13)

My invention relates to a soil irrigation system, to a method of installing and operating same, as well as to permeable tubes for such system.

For the purpose of irrigating agricultural land, two methods have been adopted on a large scale, one involving the use of a system of irrigation ditches constituting a network of feeder canals and distribution ditches, while the other method is based on the use of spraying devices supplied with water under pressure.

Both methods have serious disadvantages. Irrigation ditches constitute highly undesirable obstacles for cultivating machinery, occupy a material percentage of the agricultural area and require considerable maintenance cost. While the surface irrigation by the spraying method avoids some of these drawbacks, it involves higher operating expenses and the use of complicated spraying equipment the operation of which is likely to cause considerable damage to the crop. But the greatest disadvantage of the spraying method is the incrustation of the soil invariably attendant thereto.

It has been proposed to irrigate the soil by means of subterraneous irrigation tubes of a permeable material. While such sub-surface irrigation would avoid the disadvantages of the two above discussed systems, it has not been possible prior to my invention to reduce it to practice in the absence of any practical solution of the problem of evenly distributing the water over the area to be irrigated.

It is an object of my invention to provide a sub-surface irrigation system which permits of a complete control of the water distribution over a large area, requires a minimum of capital investment and maintenance cost, has a practically unlimited lifetime and is applicable not only to even territory but equally to uneven agricultural land.

According to my invention, this object is attainable by the use of subterraneous irrigation tubes provided with restricted permeable spots, the latter being so dimensioned and distributed that the local quantities of water oozing out from them will be substantially uniform over the entire lengths of the tubes irrespective of the difference of pressure prevailing within them at different points thereof.

Viewed from a broader aspect it is an object of my invention, to provide a sub-surface irrigation system which opens novel and unprecedented vistas towards soil treatment resulting in an improved control of all factors determining fertility so as to ensure maximum crops irrespective of variable climatic and other natural conditions difficult of control up to the present.

To this end, I may use my novel subterraneous irrigation system to supply fertilizer to the soil preferably by feeding the tube system alternately and intermittently with pure water taken from a well and with a suitable fertilizer solution. Because of the uniform and strictly controlled distribution of the fertilizer solution so supplied, there is no risk of any local overfeeding of the soil with the chemicals constituting the fertilizer.

I may also use my novel sub-surface fluid-distributing system to practice an entirely novel method of treating soil by alternating the water and the fertilizer solution with a gaseous medium under pressure such as air. By forcing air through the soil, bacterial growth, an important factor for fertility, may be materially enhanced. Similarly, any other liquid or gaseous agents for soil treatment such as insecticides, hormones, weed killers etc. may be incorporated in the soil by my novel sub-surface irrigation system.

Other objects of my invention will appear from the description of a preferred embodiment of my invention following hereinafter and the features of novelty will be pointed out in the claims.

In the accompanying drawing

Fig. 1 is a perspective view of a tube section formed with permeable spots on its top.

Fig. 2 is a longitudinal section of a joint of two tube sections,

Fig. 3 is a cross-section of the element shown in Fig. 1, e. g. along the line 3—3 of Fig. 6, Fig. 4 is a cross-section through a modified tube, Fig. 5 is a cross-section through another modification of the tube, Fig. 6 illustrates a vertical section through a feeder trough and a subterraneous irrigation tube connected thereto showing the installation thereof in uneven territory, Fig. 7 is a longitudinal section of a feeder trough shown on a smaller scale taken along line 7—7 of Fig. 6.

A typical installation of my improved sub-surface irrigation system for uneven territory is illustrated in Fig. 6, showing a vertical section through a field on a hill side slanting downwards towards the right and planted with a crop such as potatoes indicated at 10. At a depth well below the ploughing range, for instance at a depth of from 1 ft. 4" to 2 ft. subterraneous permeable irrigation tubes are installed which communicate with and extend laterally from a suitable feeder conduit such as a trough 11. These subterraneous irrigation tubes are preferably installed to extend substantially parallel at a distance of from 4 to 6 ft. With an inner diameter of 1 to 2½ inches they may have a length up to at least 100 yards. The feeder conduit 11 should be so placed in the territory that the irrigation tubes extending therefrom will in no place rise above the water level but will rather extend horizontally or downhill, broadly speaking, although the tubes may conform to local elevations as indicated for instance at the point designated by the arrow 12. Moreover, it is to be understood that the tubes, such as the one shown in Fig. 6, need not extend within a vertical plane but may extend in curves conforming to the topographical characteristics of the territory, for instance along lines of equal altitude.

As the water flows from the trough 11 into the irrigation tube towards the dead end indicated at 13 leaking through the permeable wall of the tube, the pressure prevailing in the tube will be different at different points along the tube. At 12 for instance it will be considerably lower than near the feeder trough, while the pressure may rise towards the end 13, since the latter is located at a substantially lower level. Obviously, the variation in pressure would interfere with a uniform distribution of the water leakage over the entire length of the tube in the absence of special provisions adapted to differentially control the local permeability of the irrigation tubes.

To this end, the irrigation tube is provided with restricted permeable spots, preferably located on the upwardly facing side of the tube.

For the purpose of easy installation I prefer to construct the tube of comparatively short sections 14 having their enjoining ends connected by superimposed sleeves 15. The tubes consist of a comparatively lean permeable concrete mixture. As shown in Fig. 1 they are coated with a layer 16 of a substantially impervious material, such as Portland cement. This coat serves to so limit the permeability depending on the local pressure prevailing in the tube that substantially the same quantity of water will ooze out of each of the different tube sections. To this end, the coat 16 will cover only such a portion of the surface of each tube section 14 as required to obtain a uniform leakage. Preferably, the uncovered surface is limited to a longitudinal strip. If desired, however, this strip 17 may be interrupted by extending the coat all around the periphery at spaced points as indicated at 18. The permeable spots so formed may constitute rectangular or circular windows of a diameter of about ½ inch at a distance of 2 to 4 or more inches, depending on the local water pressure and on the amount of water to be supplied to the particular locality.

The sleeves 15 are preferably cemented and sealed to the inserted tube sections 14 by Portland cement as indicated at 19 in Fig. 2.

Practical experience has shown that the following dimensions of the tube sections 14 give satisfactory results:

Length about 20 to 25 inches.
Inner diameter about 1 to 2½ inches.
Thickness of the tube wall ⅝ to ⅞ inch.
Width of the permeable strip ⅜ to 1⅛ inch.
Outer diameter 2 to 4 inches.

The thickness of the wall of the sleeve may be ⅝ inch and the length of the sleeve 5 inches.

The concrete mixture for the tube sections 14 consists of a granular material such as gravel and of Portland cement. The required degree of permeability is easily obtainable with a granular size of from 1 to 2 mm. For low water pressure the most favorable ratio of mixture of gravel to cement with respect to both, strength and permeability, is about 4:1. The concrete mixture which should have the same consistency as moist earth may be moulded manually or with the aid of machinery. Proper consistency is required to secure maximum strength. Too much water added to the mixture is likely to lead to decomposition so as to result in local accumulation of cement unduly reducing local permeability.

The sleeve 15 may be made of a gravel having granules of a size up to 3 mm. with a ratio of mixture of gravel and cement of 3 to 1.

Excellent results have been obtained with the kinds of soil of most frequent occurrence by use of tube sections having a length of 20 inches, an inner diameter of 1⅝ inches, a wall thickness of ⅝ inch, a width of the permeable strip of ⅝ inch, and an outer diameter of 2¾ inches. It will be appreciated that the degree of permeability of the different tube sections may be controlled not only by properly dimensioning the size of the permeable strips or spots but, in addition, by a proper choice of the ratio of mixture of the concrete.

The irrigation tube shown in Fig. 6 has a total length of about 100 yards being composed of 200 tube sections 14. As the limited space available on the drawings prohibits the illustration of the tube over its entire length a middle part of it located between the section lines 20 has been omitted for sake of clarity. Although the dead end 13 is located at a lower level, it is safe to assume that the water pressure prevailing near the end is substantially lower than that prevailing near the feeder trough 11 as a considerable drop of pressure is caused by both the flow resistance and the leakage through the permeable strip or spots. An exact calculation permitting of a prediction of the water pressure however, is not possible as yet. Therefore, the following procedure in installing the sub-surface irrigation system is recommended to secure proper local permeability: First, the trough 11 is built as will be described later. Then ditches are dug manually or by aid of suitable machinery for the installation of the subterraneous tubes. The bottom of the ditch accommodating the tube shown in Fig. 6 is indicated by the dotted line 21. Within this ditch the tube is built up of the tube sections 14 and of the connection sleeves 15 slipped over their ends and sealed thereto. As this work proceeds, the ditch is filled in up to the level of the tube axis so that the tube is firmly seated in the soil leaving the permeable strips on top of the tube sections easily accessible. Then the trough 11 is filled with water up to a low level. After sufficient time has passed to permit the water to fill the tube and ooze out of the permeable spots thereon, it will be readily seen how far the water will run and what leakage will result. Should it be found, for instance, that the water will run but a length of 40 to 50 yards, the area of the strip 17 is to be reduced by applying a coat of cement to the first ten or twenty tube sections, thus reducing the amount of water leaking from the same. The reduced leakage results in an extended flow of water over a length of perhaps 80 to 90 yards. Now the degree of permeability is further reduced by further application of cement coats, for instance in the manner shown in Fig. 1 at 18, until ultimately the water will leak from all of the tube sections uniformly.

It will be appreciated that this method permits the prevention of an excessive leakage at localities where increased water pressure prevails in the tube for instance in the depression existing in the territory at the place indicated by the line 3—3 in Fig. 6. The permeable spots of the tube sections located within this depression are to be so reduced as to avoid any excessive leakage. The dead end of the irrigation tube at 13 may be closed by a cap, if desired. When the permeability of all of the tubes connected to the same canal or conduit has been thus adjusted to the same degree, the ditches are filled in.

In order to secure the highest efficiency of my sub-surface irrigation system, it is necessary that special consideration be given to the capillarity and the water-holding qualities of the soil and to the climatic condition controlling water vaporization. These factors will determine the required water supply. While it is immaterial whether the permeable openings left in the impervious coat have the shape of strips or be of round or angular configuration, it is desirable that the permeable spots should be not too far spaced. Otherwise the uniformity of the water distribution will be impaired resulting in dry spots in the field. It is to be understood, of course, that the emphasis placed hereinabove and in the claims following hereinafter on equal and uniform distribution of the water over the entire length of the irrigation tube is not to be construed as excluding a locally increased water supply at such places as may require more water, for instance by reason of the characteristics of the local soil or by reason of particular climatic conditions such as situation on sunny hill sides.

While I prefer to construct the water supply or feeder conduit as a trough, I do not wish to limit my invention thereto. The design of the feeder conduit described hereinafter with reference to Figs. 6 and 7 offers the advantage however, of supplying the water to the irrigation tube at a clearly defined definite pressure.

As shown in Fig. 6 the conduit consists of a trough formed by two lateral brick walls and a bottom brick wall being lined on the inside with a layer 22 of concrete. Should the territory require that the trough extend from a higher to a lower level, I construct it, as shown in Fig. 7, of adjoining horizontal sections separated by baffles 23 causing the water to cascade over the top of such baffles from the higher to the lower trough sections.

The irrigation tubes communicate with the trough at points located well above the bottom of the trough, e. g. about 8 inches, so that any dirt or foreign matter that might get into the trough may collect near its bottom below the mouths 24 of the irrigation tubes. These mouths are preferably closed by wire sieves.

While Fig. 6 illuustrates but a single irrigation tube extending from the trough 11 to one side thereof, it is obvious that such tubes might extend laterally from both sides, if the topographical characteristics of the territory permit of such an arrangement. Similarly, a number of irrigation conduits such as 11 may be provided to extend substantially parallel to each other and the irrigation tubes may extend from one feeder conduit to the next, provided the territory is substantially free from steep slopes.

The baffles 23 should be so arranged as to keep the water level about 2 to 2½ ft. above the mouths 24 of the irrigation tubes. In this way the water pressure will be sufficient to ensure a uniform leakage from the irrigation tube over a length of the latter up to at least 100 yards. If desired, the baffles may be made adjustable to permit of a change of the water level. The conduit or conduits 11 are fed with water from any suitable source. Where hot springs are available, my irrigation system may be used to raise the soil temperature uniformly over a very large area. This is particularly desirable in cold climates.

While most kinds of soil do not involve the risk of a gradual obstruction of the pores of the irrigation tubes by colloidal components of the soil, it may happen with heavy soils that in the course of a number of years, the degree of permeability may be reduced by the entry of colloids into the pores. In order to reduce such a possibility it may be well to cover the permeable strip of the tube by sand or gravel which acting as a filter prevents any such entry of colloidal matter. For this purpose tube sections of the kind illustrated in Fig. 4 may be employed which are formed with an upper longitudinal groove, the impervious coat covering substantially the entire surface of the tube sections except for the bottom of the groove. The groove may have a depth of about 1 inch and width of about 1½ inches. The sand or gravel is placed into such groove, as indicated at 25.

At places where the irrigation tube is placed within a light sandy soil in which the water tends to trickle downwards easily, it is advisable to take special steps to enlarge the area of contact of the water leaking out of the tube with the overlying soil. For this purpose so much soil is filled into the ditch after the cement coating has been applied for proper adjustment of the degree of permeability that the top surface of the soil is on level with the lateral margins of the permeable strip. The top surface of the soil is then smoothened as indicated at 26 in Fig. 5 and layers 27 of concrete are applied to such smooth top surface on both sides of the permeable strip, such layers constituting ledges of concrete extending laterally from the uncoated longitudinal strips on top of the tube sections. Each of the ledges may have a width of about 4 inches. They prevent the water from directly trickling into the soil surrounding the tube keeping the water in contact with the overlying earth over a larger area.

In the embodiment shown in Fig. 6 I have assumed that a clay pit exists in the field at the place indicated by the arrow 12. Therefore, the tube sections employed at that locality are of the type illustrated in Fig. 4. Moreover, I have assumed that the last 20 yards of the tube are located in a sandy soil. Therefore, the last 40 tube sections, three of which appear in Fig. 6 at the right of lines 20, are provided with the concrete ledges 27 of Fig. 5.

In such cases where variations in water pressure over the entire length of the irrigation tube are considerable, I prefer to use different kinds of materials for the tube sections 14 depending on the pressure prevailing therein. Thus I may use a richer concrete mixture for the first 60 sections counted from the trough 11, a leaner more porous concrete mixture for the next 60 sections and a still leaner concrete mixture for the rest. Alternatively, the leakage may be reduced by interspersing impervious tube sections between the impermeable sections, for instance, by inserting one impervious section after every two or three permeable sections. To avoid confusions when installing the tubes, the different kinds of tube sections may be distinguished by addition to the mixture of different colors.

There exists no risk of a chemical deterioration of the concrete by the fertilizer solutions, since the latter are extremely diluted and since precautions may be taken to first cause precipitation of obnoxious components such as sulphuric acid contained in super phosphate.

While I prefer to use concrete for the manufacture of the permeable tube sections, it is obvious that any other suitable porous material may be elected for that purpose, such as ceramic materials, e. g. earthenware. Moreover, it is obvious, that the irrigation tube need not necessarily be built up of short sections but may be produced as an integral unit of any suitable length by the use of molding machinery producing the tube at the bottom of the ditch by an extrusion process, as is well known in the art of drainage tubes. In many other respects, a departure from the specific embodiment described hereinabove comes within the purview of my invention. Thus, the trough 11 instead of being constructed of bricks, may be composed of adjoining U-shaped sections of the earthenware. Alternatively, the conduit 11 may be formed by a subterranean feeder tube. Other modifications will be apparent to anyone skilled in the art.

From the foregoing specification of my invention it will be apparent that it offers the following material advantages compared with the irrigation systems used prior to my invention:

(a) My improved system ensures permanent readiness for operation and renders it possible at any time to maintain the desired humidity or moisture equivalent in the soil thus preventing any disturbances in plant growth entailed by even minor water shortages. In this respect my invention is far superior to spraying methods.

(b) The system saves maintenance cost and requires but a negligible portion of the agricultural area for the troughs 11 as distinguished from a system using irrigation ditches.

(c) Water loss by evaporization is negligible whereas it may amount to considerable percentage with prior systems.

(d) Since the water need not be supplied under pressure as in spraying systems, the power consumption for the water supply is a minimum.

(e) Any incrustation of the soil is avoided and the whole area is permanently accessible to cultivating machinery.

(f) An irrigation with fertilizer solutions does no longer entail the risk of any local overdoses being administered.

(g) Not only liquid but gaseous media may be uniformly incorporated in the soil.

While the capital investment required may be larger than with some other systems experience has shown that it amounts to but from 3 to 4 times the annual profit from increased crops.

Prior to my invention in many cases large evaporization losses prevented the exclusive use of underground water for irrigation purposes since such losses were liable to result in a gradual lowering of the underground water level to an excessive degree. With my invention, however, any water not absorbed by the plants will trickle into the ground and return to the underground water supply thus preserving the same. This is a great advantage of my invention, as it permits to make use of underground water in regions in which little or no surface water supplies are available.

While I have described my invention with reference to a preferred embodiment thereof, I wish it to be expressly understood that my invention is in no way limited to the details of such embodiment but is capable of numerous modifications within the scope of the appended claims.

What I claim is:

1. An irrigation system for uneven territory comprising an irrigation conduit adapted to be connected with a water supply, a plurality of subterraneous pervious irrigation tubes communicating with said conduit and positioned within an uneven plane substantially equidistant of the surface of said territory, and means combined with said tubes for differential restriction of their degree of perviousness substantially inversely proportional to the pressure prevailing within said tubes at different points thereof.

2. An irrigation system for uneven territory comprising at least one irrigation conduit adapted to be connected with a water supply, a plurality of substantially parallel subterraneous irrigation tubes of a porous material communicating with said conduit and positioned within an uneven plane substantially equidistant of the surface of said territory, substantially impervious layers on said tubes covering a proportion of their surfaces said proportions depending on the pressure prevailing within said tubes at different points thereof.

3. An irrigation system for uneven territory comprising an irrigation trough extending from a higher to a lower level of the territory and adapted to be connected with a water supply at a high-level-point, cascade baffles provided within said trough to keep it filled over its entire length, a plurality of subterraneous permeable irrigation tubes communicating with and extending laterally from said trough, the degree of permeability of said tubes differing at different points along said tubes substantially inversely proportional to the water pressure prevailing at said points along said tubes.

4. An irrigation system for uneven territory comprising an irrigation trough extending on the surface of the territory and adapted to be connected with a water supply at at least one high-level-point, cascade baffles provided within said trough to keep it filled over its entire length, a plurality of subterraneous irrigation tubes communicating with and extending laterally from said trough substantially parallel to the surface of the latter, said tubes being comprised of adjoining tube sections consisting of a permeable material, of connecting sleeves engaging over and cemented to the adjoining ends of said sections, and of a substantially impervious layer on said tube sections covering a proportion of the surface of each individual section, said proportion depending on both, the distance of each individual section from and the depths of the latter relative to said trough.

5. An irrigation system for uneven territory comprising an irrigation conduit adapted to be connected with a source of water at a high-level-point, a plurality of subterraneous permeable irrigation tubes communicating with and extending laterally from said conduit substantially equidistant of the surface of said territory at a depth of from 1 to 2 feet the degree of permeability of said tubes being different at different points along said tubes depending on the water pressure prevailing at different points along said tubes.

6. An irrigation system for uneven territory comprising an irrigation trough extending on the surface of the territory and adapted to be connected with a water supply at at least one high-level-point, cascade baffles provided within said trough to keep it filled over its entire length, a plurality of subterraneous irrigation tubes communicating with and extending laterally from said trough substantially parallel to the surface of the latter, said tubes being composed of adjoining tube sections of a permeable lean concrete mixture and of connecting sleeves engaging over and cemented to the adjoining ends of said sections, the latter being provided with substantially impervious coats of a rich concrete mixture covering part of the surface of said tube sections, said coats being so dimensioned as to ensure substantially equal amounts of water oozing out of the uncoated portions of the tube sections irrespective of any difference in water pressure that might prevail at different points along said tubes.

7. An irrigation system for uneven territory comprising an irrigation trough extending from a higher to a lower level of the territory and adapted to be connected with a water supply at a high-level-point, cascade baffles provided within said trough to keep it filled over its entire length, a plurality of subterraneous permeable irrigation tubes communicating with said trough at points located above the bottom thereof and extending from said trough, the degree of permeability of said tubes differing along said tubes so as to equalize the quantity of water oozing out of said tubes at different sections along the same.

8. A method of installing an irrigation system of subterraneous tube sections each having at least one permeable spot on its wall comprising the steps of placing the tube sections with their permeable spots facing upwardly into ditches in adjoining positions, connecting said tube sections with each other and with a common source of water under pressure, coating so much of the area of said permeable spots that substantially equal amounts of water will ooze out of the permeable spots of the different tube sections irrespective of the distance of the latter from said source of water, and filling in said ditches.

9. A subterraneous irrigation system for uneven territory including irrigation tubes located within the soil in an uneven plane substantially equidistant from the surface of said territory, said tubes being composed of sections made of a porous material, a substantially impervious coat being provided on each section so as to leave a top portion of the tube surface uncovered, said portion being larger with tube sections placed on a higher level than with tube sections placed on a lower level.

FRITZ STAUCH.

References Cited in the file of this patent

UNITED STATES PATENTS

| Number | Name | Date |
| --- | --- | --- |
| 271,089 | Lynch | Jan. 23, 1883 |
| 640,077 | Bagby | Dec. 26, 1899 |
| 888,217 | Bishop | May 19, 1908 |
| 1,538,669 | Smith | May 19, 1925 |
| 1,677,153 | Spencer | July 17, 1928 |
| 2,052,020 | Black | Aug. 25, 1936 |
| 2,309,233 | Black | Jan. 26, 1943 |

FOREIGN PATENTS

| Number | Country | Date |
| --- | --- | --- |
| 290,467 | Great Britain | of 1928 |
| 507,865 | Great Britain | of 1939 |
| 848,988 | France | of 1939 |